US00RE50389E

(19) United States
(12) Reissued Patent
Yi

(10) Patent Number: US RE50,389 E
(45) Date of Reissued Patent: Apr. 15, 2025

(54) METHOD AND DEVICE FOR OPERATING ACCORDING TO GROUP COMMON DCI IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

(21) Appl. No.: 18/114,752

(22) Filed: Feb. 27, 2023

Related U.S. Patent Documents

Reissue of:
(64) Patent No.: 11,039,438
Issued: Jun. 15, 2021
Appl. No.: 16/857,095
Filed: Apr. 23, 2020

U.S. Applications:
(63) Continuation of application No. PCT/KR2018/012816, filed on Oct. 26, 2018.

(60) Provisional application No. 62/577,692, filed on Oct. 26, 2017, provisional application No. 62/593,992, filed on Dec. 3, 2017, provisional application No. 62/594,479, filed on Dec.
(Continued)

(30) Foreign Application Priority Data

Oct. 26, 2018 (KR) ..... 10-2018-0128638

(51) Int. Cl.
*H04W 72/23* (2023.01)
*H04L 5/14* (2006.01)
*H04W 72/0446* (2023.01)

(52) U.S. Cl.
CPC ..... *H04W 72/0446* (2013.01); *H04L 5/14* (2013.01); *H04W 72/23* (2023.01)

(58) Field of Classification Search
CPC ..... H04W 72/0446; H04W 72/23; H04L 5/14
See application file for complete search history.

(56) References Cited

U.S. PATENT DOCUMENTS 11,039,438 B2 6/2021 Yi
2012/0250643 A1 10/2012 He et al.
(Continued)

FOREIGN PATENT DOCUMENTS

WO 2017032408 3/2017
WO 2018097680 5/2018

OTHER PUBLICATIONS

LG Electronics, "Remaining details on supplementary UL in NR LTE coexistence," 3GPP TSG RAN WG1 Meeting #90, R1-1713221, Aug. 2017, 6 pages.
(Continued)

*Primary Examiner* — Mark Sager
(74) *Attorney, Agent, or Firm* — LEE, HONG, DEGERMAN, KANG & WAIMEY

(57) ABSTRACT

Provided are a method and device for configuring a slot formation indication (SFI) in a wireless communication system, particularly in new radio (NR) access technology. A user equipment (UE) receives, from a network, a first SFI for an unpaired carrier, configures a first slot in the unpaired carrier on the basis of the first SFI, receives, from the network, a second SFI for a supplemental uplink (SUL) carrier, and configures a second slot in the SUL carrier on the basis of the second SFI. The first SFI and the second SFI are separate pieces of information.

12 Claims, 12 Drawing Sheets

Related U.S. Application Data

4, 2017, provisional application No. 62/595,020, filed on Dec. 5, 2017.

(56) References Cited

U.S. PATENT DOCUMENTS

| | | | | |
|---|---|---|---|---|
| 2016/0037493 | A1 | 2/2016 | Kim et al. | |
| 2017/0290000 | A1* | 10/2017 | Parkvall | H04W 72/0446 |
| 2018/0279274 | A1* | 9/2018 | Sun | H04L 1/1864 |
| 2018/0367289 | A1* | 12/2018 | Kim | H04W 72/0446 |
| 2019/0053227 | A1* | 2/2019 | Huang | H04L 25/03006 |
| 2019/0082451 | A1* | 3/2019 | Yun | H04W 74/0833 |
| 2019/0104554 | A1* | 4/2019 | Amuru | H04W 72/042 |
| 2020/0015261 | A1* | 1/2020 | Takeda | H04W 72/0446 |
| 2020/0128578 | A1* | 4/2020 | Park | H04W 72/01289 |
| 2020/0169990 | A1* | 5/2020 | Takeda | H04W 52/325 |

OTHER PUBLICATIONS

State Intellectual Property Office of the People's Republic of China Application Serial No. 201880069043.1, Office Action dated Jan. 13, 2023, 7 pages.
U.S. Appl. No. 16/857,095, Office Action dated Aug. 10, 2020, 8 pages.
U.S. Appl. No. 16/857,095, Final Office Action dated Nov. 13, 2020, 8 pages.
Catt, "Remaining aspects of BWP operation," 3GPP TSG-RAN WG1 #90bis, R1-1717839, Oct. 2017, 4 pages.
NTT Docomo, Inc., "Work plan for Rel-15 NR WI," 3GPP TSG-RAN WG1 #90bis, R1-1718177, Oct. 2017, 173 pages.
Korean Intellectual Property Office Application Serial No. 10-2018-0128638, Office Action dated Jul. 10, 2019, 2 pages.
Huawei, "Initial access and uplink operations with SUL ," 3GPP TSG-RAN WG1 Meeting #90, R1-1712165, Aug. 2017, 8 pages.
LG Electronics, "Remaining details on supplementary UL in NR LTE coexistence," 3GPP TSG RAN WG1 Meeting 190, R1-1713221, Aug. 2017, 6 pages.
Huawei, "Discussion on the Prach for SUL," 3GPP TSG RAN WG1 Meeting NR#3, R1-1715716, Sep. 2017, 7 pages.
NTT Docomo, Inc., "Views on other aspect on carrier aggregation," 3GPP TSG RAN WG1 Meeting #90bis, R1-1718224, Oct. 2017, 5 pages.
PCT International Application No. PCT/KR2018/012816, International Search Report dated Jan. 24, 2019, 4 pages.
European Patent Office Application Serial No. 18871281.4, Search Report dated Oct. 1, 2020, 9 pages.
Qualcomm Incorporated, "Views on UL Sharing", RP-171605, 3GPP RAN #77, Sep. 2017, 12 pages.
LG Electronics, "Discussion on group common PDCCH", R1-1717953, 3GPP TSG RAN WG1 #90bis, Oct. 2017, 11 pages.
NTT Docomo, Inc., "Remaining issues on group-common PDCCH", R1-1718205, 3GPP TSG RAN WG1 Meeting 90bis, Oct. 2017, 10 pages.
Intel Corporation, "On group-common PDCCH", R1-1716308, 3GPP TSG RAN WG1 Meeting NR#3, Sep. 2017, 10 pages.

* cited by examiner

METHOD AND DEVICE FOR OPERATING ACCORDING TO GROUP COMMON DCI IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 11,039,438, issued on Jun. 15, 2021 from U.S. patent application Ser. No. 16/857,095, filed on Apr. 23, 2020, which* is a continuation of International Application No. PCT/KR2018/012816, filed on Oct. 26, 2018, which claims the benefit of U.S. Provisional Patent Application Nos. 62/577,692 filed on Oct. 26, 2017, 62/593,992 filed on Dec. 3, 2017, 62/594,479 filed on Dec. 4, 2017, 62/595,020 filed on Dec. 5, 2017, and Korean Patent Application No. 10-2018-0128638 filed on Oct. 26, 2018, the contents of which are hereby incorporated by reference herein in [its] *their* entirety.

TECHNICAL FIELD

The present disclosure relates to wireless communication, and more particularly, to a method and apparatus for operating according to group common downlink control information (DCI) in a wireless communication system, particularly, in a new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

The initial access of the NR is for initial synchronization of downlink and system information acquisition and radio resource control (RRC) connection through a random access procedure, which is basically the same as the purpose of the initial access technology of the 3GPP LTE/LTE-A. In addition, the NR includes various element technologies for supporting multi-beam transmission and wideband from the initial access stage.

NR provides flexibility that can efficiently multiplex various services such as eMBB and URLLC in a time domain and a frequency domain by using time alignment of a symbol level for a transmitting method of using various slot lengths, use of mini-slots, and different subcarrier spacing. Further, unlike LTE, NR defines uplink/downlink resource allocation as a symbol level within one slot. In order to reduce hybrid automatic repeat request (HARQ) delay, a slot structure capable of directly transmitting an HARQ acknowledgment/non-acknowledgement (HARQ ACK/NACK) within a transmission slot has been defined, and such a slot structure is referred to as a self-contained structure. Further, unlike the existing LTE, NR supports a common frame structure constituting a frequency division duplex (FDD) or time division duplex (TDD) frame through a combination of various slots. Further, NR introduces a dynamic TDD scheme to freely dynamically adjust a transmission direction of individual cells according to traffic characteristics.

SUMMARY

In NR, a group common control channel defines so as to transmit information about a slot structure. Information about the slot structure may be transmitted through downlink control information (DCI) on the group common control channel. The present disclosure discusses a UE operation related to a group common control channel and/or DCI.

In an aspect, a method for operating by a user equipment (UE) in a wireless communication system is provided. The method includes receiving a first slot formation indication (SFI) for an unpaired carrier from a network, configuring a first slot in the unpaired carrier based on the first SFI, receiving a second SFI for a supplemental uplink (SUL) carrier from the network, and configuring a second slot in the SUL carrier based on the second SFI. The first SFI and the second SFI are separate information.

In another aspect, a user equipment (UE) in a wireless communication system is provided. The UE includes a memory, a transceiver, and a processor connected to the memory and the transceiver. The processor is configured to control the transceiver to receive a first slot formation indication (SFI) for an unpaired carrier from a network, configure a first slot in the unpaired carrier based on the first SFI, control the transceiver to receive a second SFI for a supplemental uplink (SUL) carrier from the network, and configure a second slot in the SUL carrier based on the second SFI. The first SFI and the second SFI are separate information.

In another aspect, a method for operating by a base station (BS) in a wireless communication system is provided. The method includes transmitting a first slot formation indication (SFI) for an unpaired carrier to a user equipment (UE), and transmitting a second SFI for a supplemental uplink (SUL) carrier to the UE. The first SFI and the second SFI are separate information.

A UE can receive information on a slot structure efficiently.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
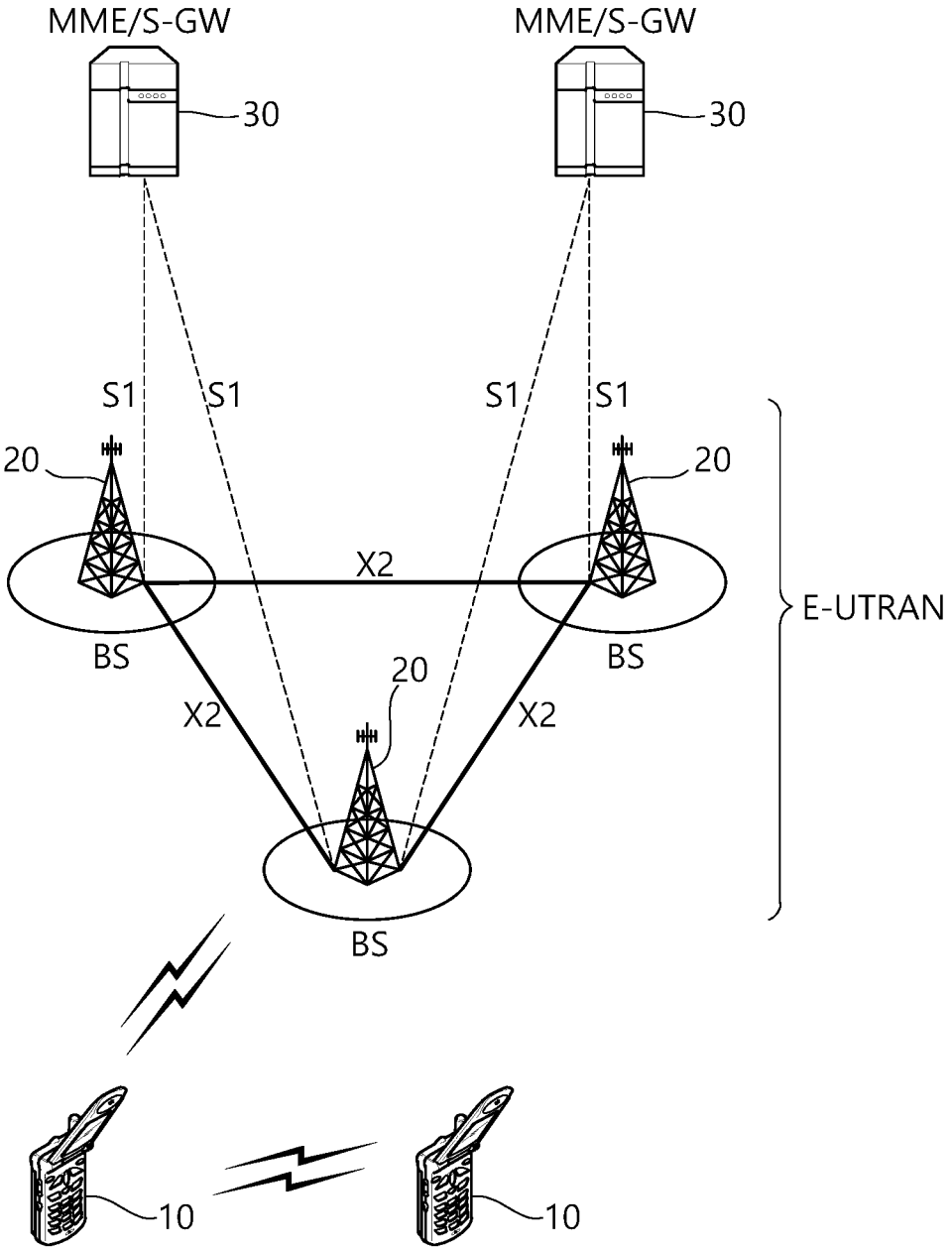
FIG. 1 shows an example of a wireless communication system to which technical features of the present disclosure can be applied.

FIG. 1 shows an example of a wireless communication system to which technical features of the present disclosure can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
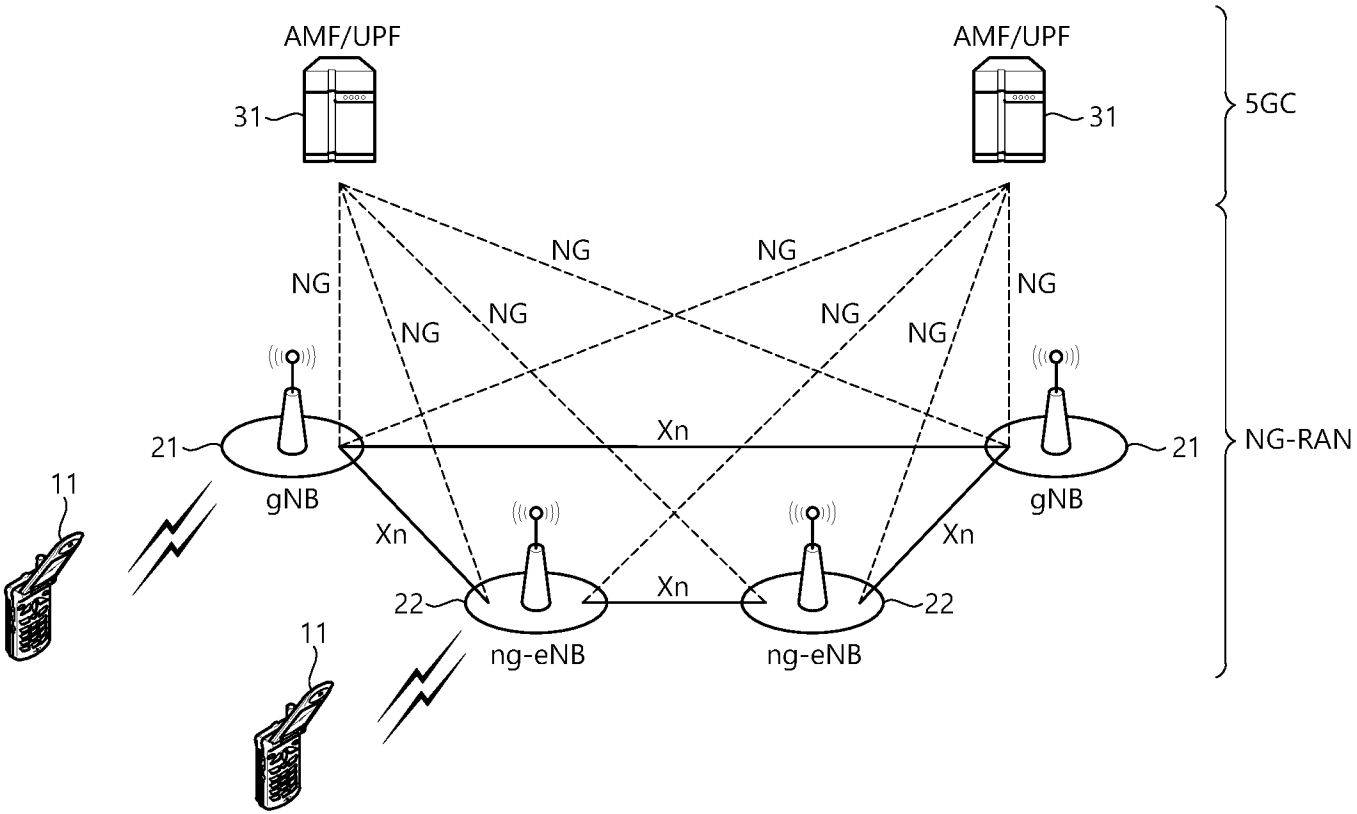
FIG. 2 shows another example of a wireless communication system to which technical features of the present disclosure can be applied.

FIG. 2 shows another example of a wireless communication system to which technical features of the present disclosure can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index μ.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g., μ=0, 1 . . . 4) may be represented as a first subcarrier spacing, a second subcarrier spacing . . . Nth subcarrier spacing. Referring to Table 1, transmission of user data (e.g., physical uplink shared channel (PUSCH), physical downlink shared channel (PDSCH)) may not be supported depending on the subcarrier spacing. That is, transmission of user data may not be supported only in at least one specific subcarrier spacing (e.g., 240 kHz).

In addition, referring to Table 1, a synchronization channel (e.g., a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g., 60 kHz).

In NR, a number of slots and a number of symbols included in one radio frame/subframe may be different according to various numerologies, i.e., various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 3:
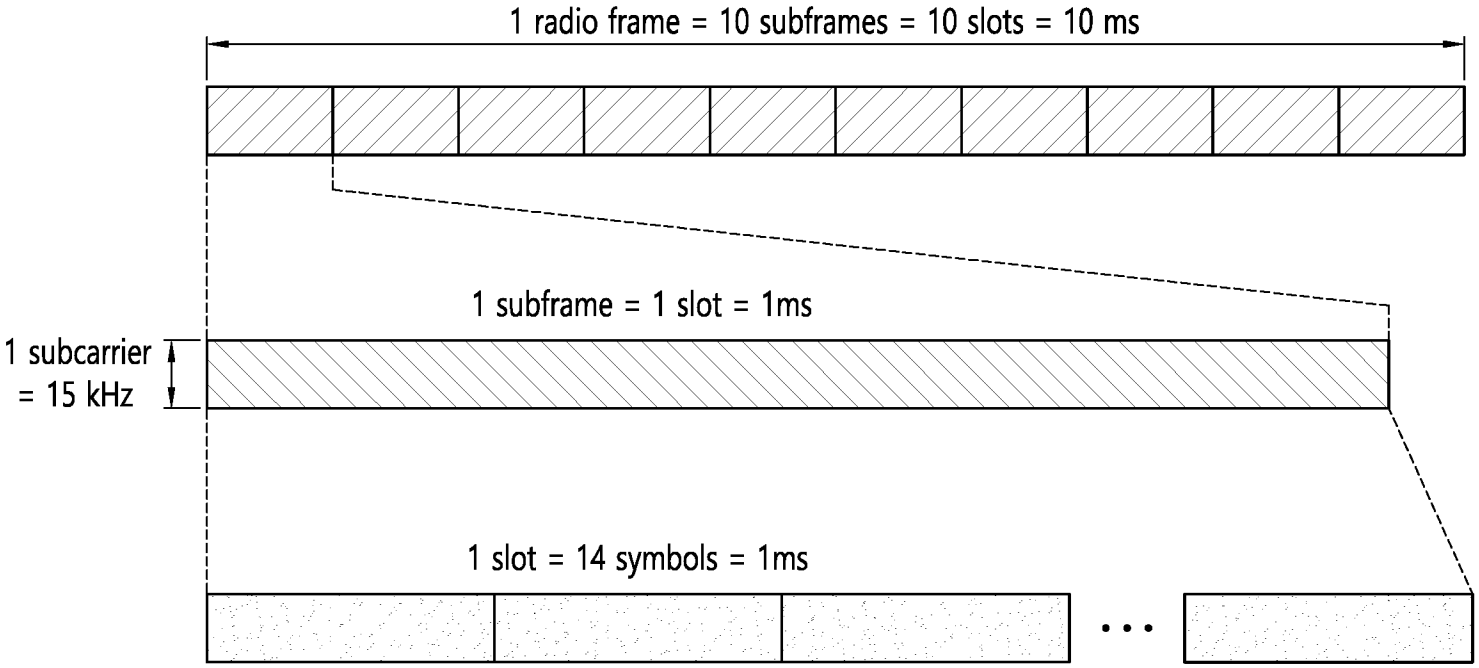
FIG. 3 shows an example of a frame structure to which technical features of the present disclosure can be applied.

Referring to Table 2, when a first numerology corresponding to μ=0 is applied, one radio frame includes 10 subframes, one subframe corresponds to one slot, and one slot consists of 14 symbols. In the present disclosure, a symbol refers to a signal transmitted during a specific time interval. For example, a symbol may refer to a signal generated by OFDM processing. That is, a symbol in the present disclosure may refer to an OFDM/OFDMA symbol, or SC-FDMA symbol, etc. A CP may be located between each symbol. FIG. 3 shows an example of a frame structure to which technical features of the present disclosure can be applied. In FIG. 3, a subcarrier spacing is 15 kHz, which corresponds to μ=0.

Figure 4:
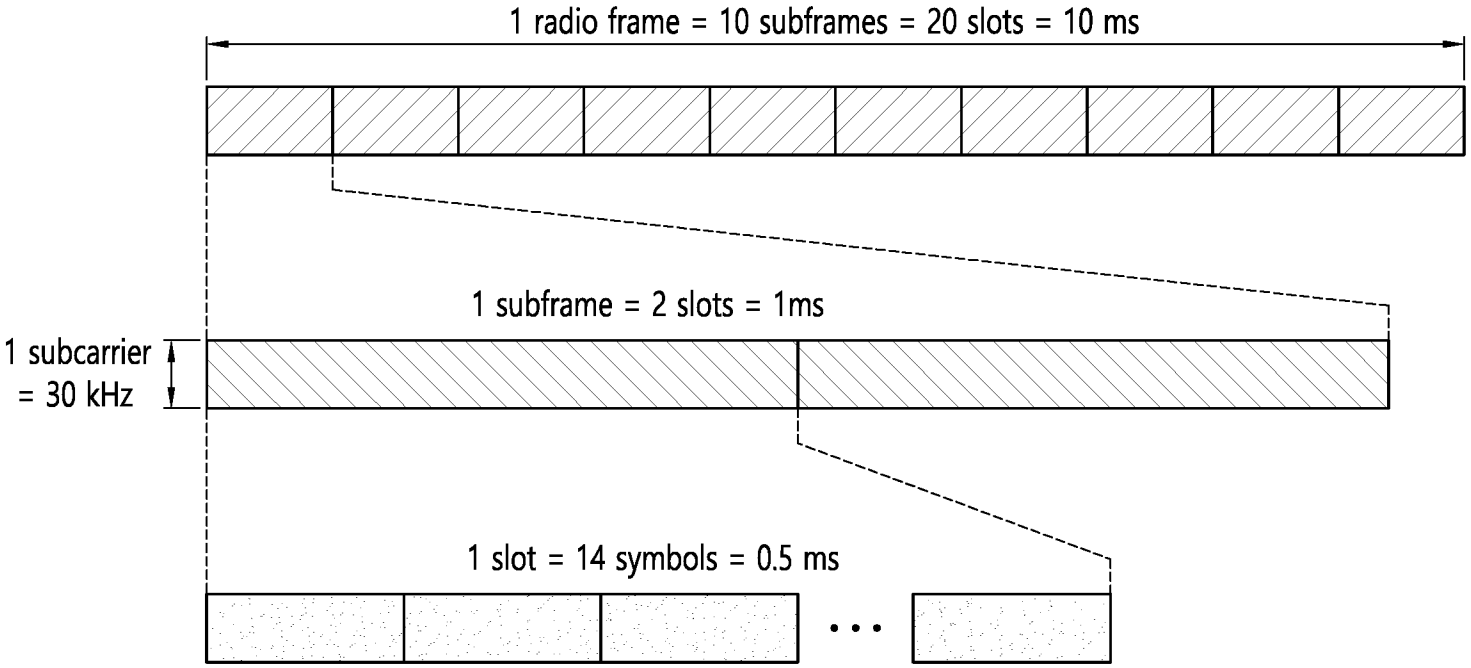
FIG. 4 shows another example of a frame structure to which technical features of the present disclosure can be applied.

FIG. 4 shows another example of a frame structure to which technical features of the present disclosure can be applied. In FIG. 4, a subcarrier spacing is 30 kHz, which corresponds to μ=1.

Meanwhile, a frequency division duplex (FDD) and/or a time division duplex (TDD) may be applied to a wireless communication system to which embodiments of the present disclosure is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| . . . | | | | | | | | | | | | | | |

For convenience of explanation, Table 3 shows only a part of the slot format actually defined in NR. The specific allocation scheme may be changed or added. The UE may receive a slot format configuration via a higher layer signaling (i.e., radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
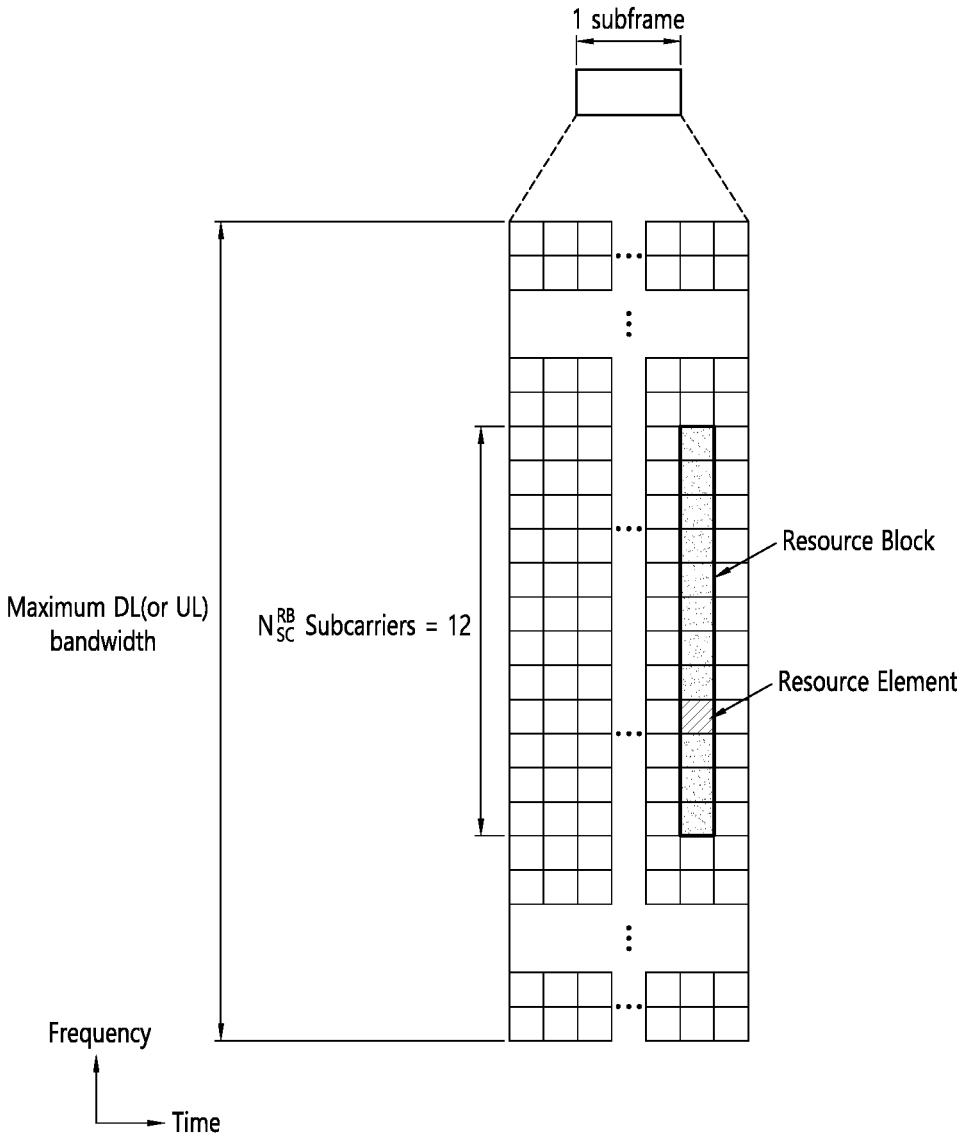
FIG. 5 shows an example of a resource grid to which technical features of the present disclosure can be applied.

FIG. 5 shows an example of a resource grid to which technical features of the present disclosure can be applied.

An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ," symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
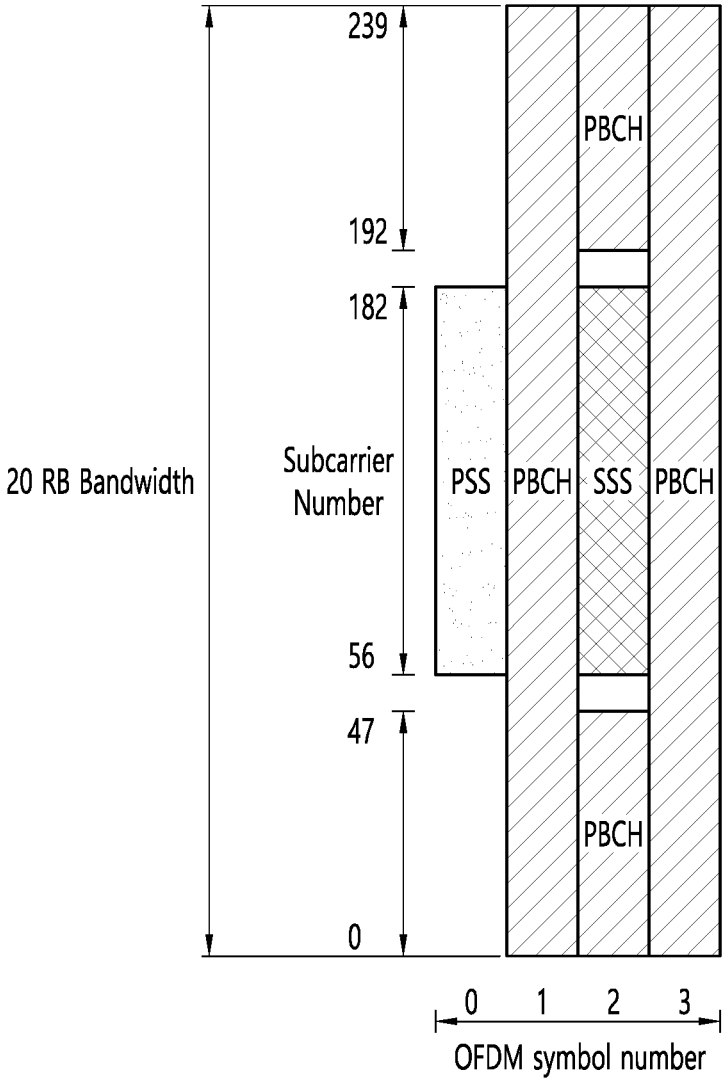
FIG. 6 shows an example of a synchronization channel to which technical features of the present disclosure can be applied.

FIG. 6 shows an example of a synchronization channel to which technical features of the present disclosure can be applied. Referring to FIG. 6, the PSS and SSS may include one symbol and 127 subcarriers. The PBCH may include 3 symbols and 240 subcarriers.

The PSS is used for synchronization signal/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g., random access operations). The SS/PBCH block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e., PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g., information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e., one RB transmitted through one OFDM symbol. Each REG includes a DM-RS. One CCE includes a plurality of REGs (e.g., 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g., up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
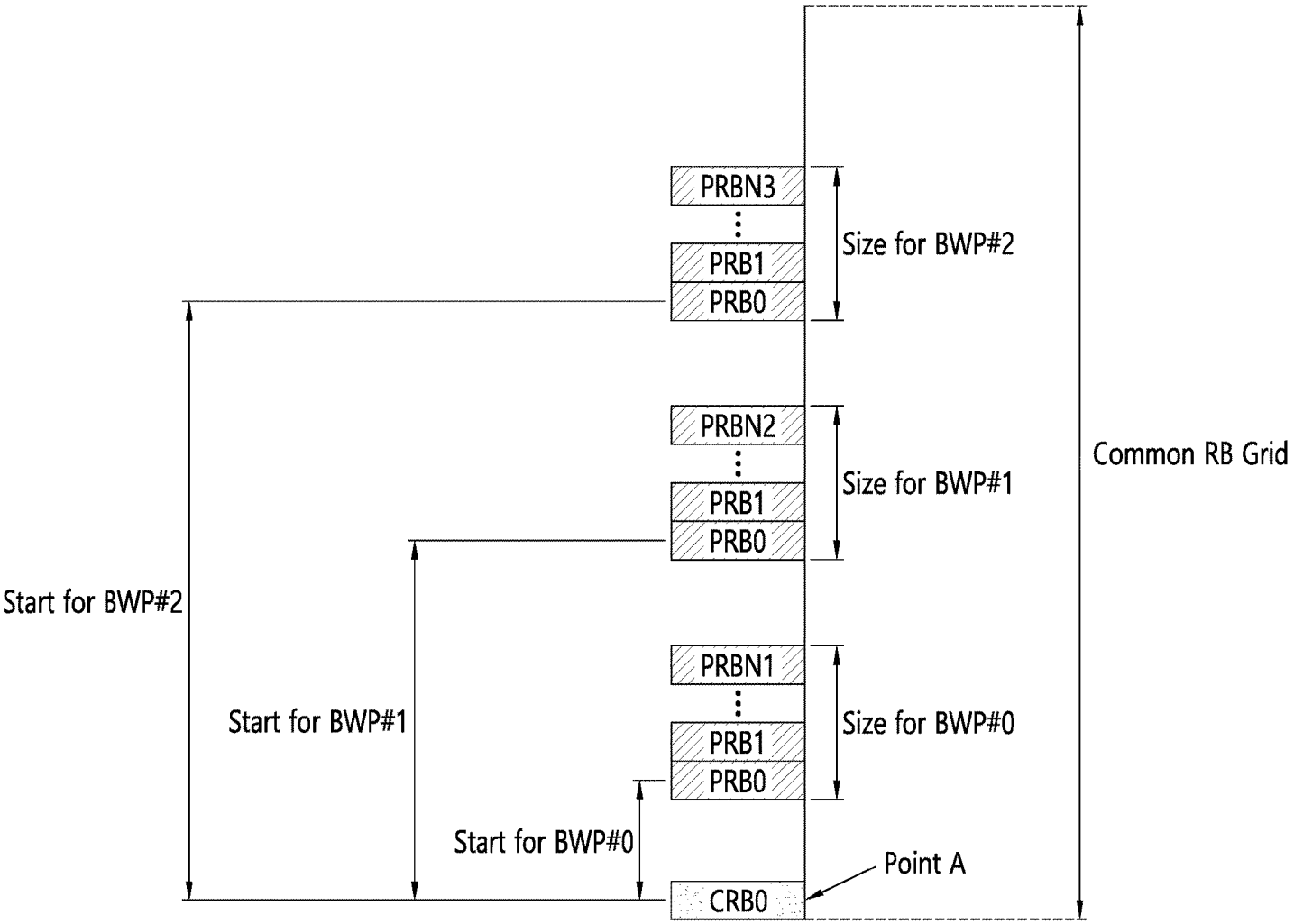
FIG. 7 shows an example of a frequency allocation scheme to which technical features of the present disclosure can be applied.

FIG. 7 shows an example of a frequency allocation scheme to which technical features of the present disclosure can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e., SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g., primary cell (PCell)). A plurality of BWPs may be configured for each cell individually or commonly.

Referring to FIG. 7, each BWP may be defined by a size and starting point from CRB0. For example, the first BWP, i.e., BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g., one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
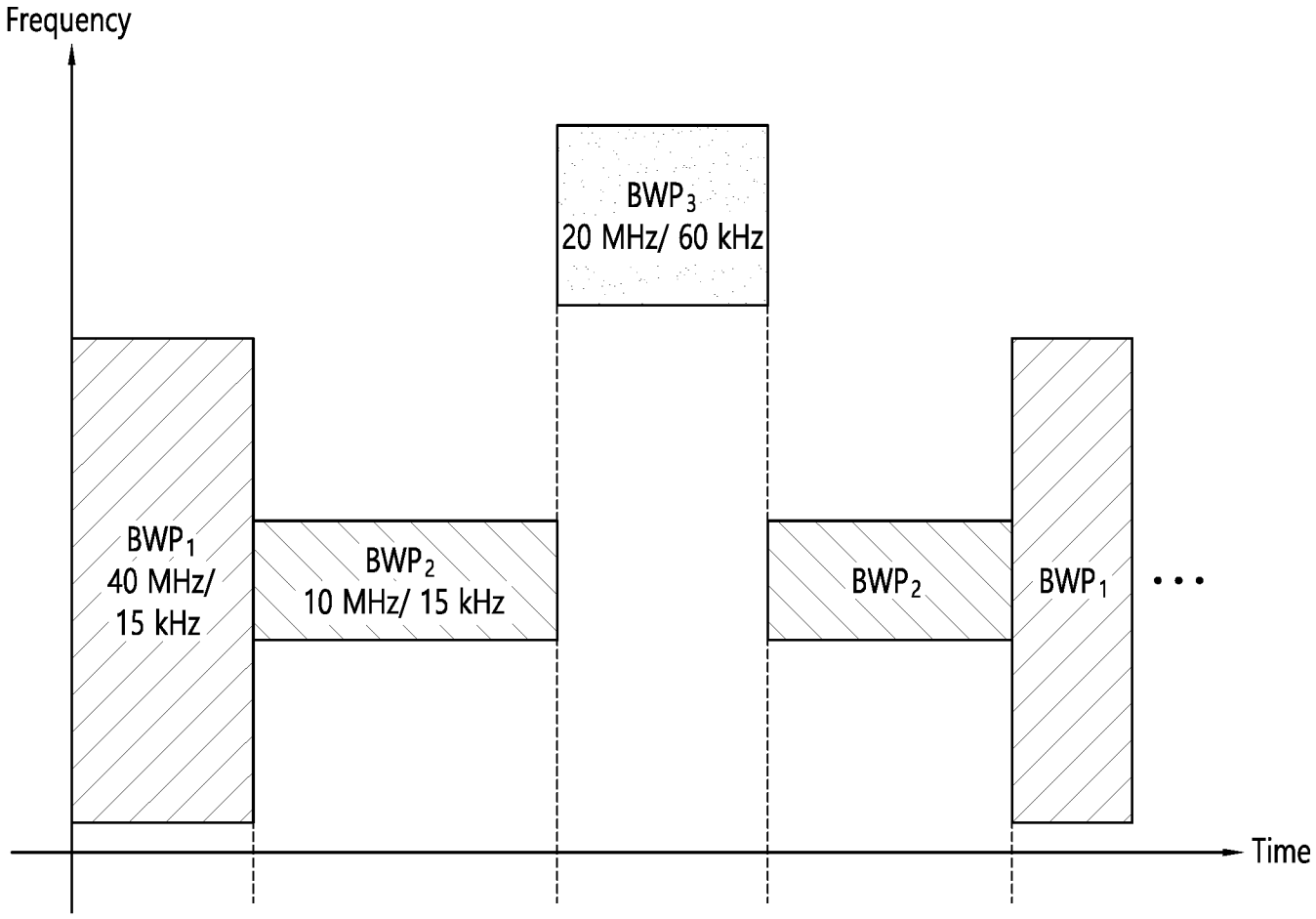
FIG. 8 shows an example of multiple BWPs to which technical features of the present disclosure can be applied.

FIG. 8 shows an example of multiple BWPs to which technical features of the present disclosure can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

As described above, a slot format is configured in NR. The slot format may be semi-statically configured through RRC signaling. The slot format configured semi-statically through RRC signaling is information on a slot format preferentially applied first. The RRC signaling may be transmitted cell-specifically or may be additionally transmitted UE-specifically. A symbol determined to a flexible symbol by a slot format configured semi-statically may be later updated to a DL symbol or a UL symbol by a semi-static configuration, a group common PDCCH, UE scheduling DCI, etc.

The group common PDCCH is a channel to which group common DCI is transmitted. The group common DCI may correspond to a DCI format 2_0. The group common PDCCH is a channel commonly transmitted to UEs of a group defined by specific criteria. The group may be configured through a slot format indication (SFI)-RNTI scrambling group common DCI. UEs included in the group may include scheduled UEs and unscheduled UEs. The UE may separately receive a configuration on whether the group common DCI should be received through the group common PDCCH through RRC signaling.

Information delivered to the group through the group common DCI includes a dynamic SFI. That is, the dynamic SFI included in the group common DCI may update resources defined to a flexible symbol in a semi-statically configured slot format to DL symbols or UL symbols. There is a UE-specific SFI table that may have for each UE, and the dynamic SFI may include information on an index of the corresponding table.

In relation to the group common PDCCH/DCI, the following issues may be raised.

(1) Time point in which information transmitted through the group common PDCCH/DCI is applied (2) Whether a dynamic SFI transmitted through the group common PDCCH/DCI is valid, and a method in which the dynamic SFI cancels and/or changes an already configured/indicated resource.

(3) A method of processing different numerologies between different BWPs and/or a method of grouping a plurality of UEs supporting different numerologies (4) Method of applying a group common PDCCH/DCI to carriers or supplemental UL (SUL) having different numerologies (5) Method of operating a timer that may enable discontinuous reception (DRX) and/or a UE to return to a default BWP (6) Method of indicating a slot format In order to solve the above-described issues, various aspects of a UE and/or BS operation according to a group common PDCCH/DCI will be described according to an embodiment of the present disclosure.

1. Time point for applying a group common PDCCH/DCI

For each group common PDCCH/DCI, there may be timing associated therewith. The UE may apply information transmitted through a group common PDCCH/DCI at the associated timing. The timing should be at least greater than a processing time of the group common PDCCH/DCI.

For a group common PDCCH/DCI carrying an SFI, a processing time for each UE may be different according to the number of candidates to be monitored in order to detect a group common PDCCH/DCI. In order to solve different processing times between UEs, the following may be considered.

In a current slot to which the group common PDCCH/DCI is transmitted, the UE may determine whether to apply the SFI included in the group common PDCCH/DCI. To this end, the group common PDCCH/DCI may always include an SFI starting from a next slot instead of a current slot. The same is applied when a period of the group common PDCCH/DCI is 1 slot. Whether the group common PDCCH/DCI includes an SFI for a current slot or an SFI starting from a next slot may be configured by the network and/or may be determined implicitly according to the number of candidates to be monitored for a group common PDCCH/DCI.

When the group common PDCCH/DCI includes an SFI for a current slot, in order to solve a processing time problem, the SFI may not be applied to at least first few symbols in the current slot. For example, the SFI may not be applied to a last symbol of a CORESET in which the group common PDCCH/DCI is transmitted from a first symbol of the current slot. Alternatively, the SFI may not be applied as much as a processing time of the group common PDCCH/DCI+a last symbol of the CORESET to which the group common PDCCH/DCI is transmitted from the first symbol of the current slot. The processing time may be determined as the minimum gap between search space opportunities required for the UE to detect a group common PDCCH/DCI (and a configuration of potentially the same quasi-collocation (QCL) relationship). The processing time may be different according to each UE and may be different according to each reporting capability of an UE. For example, when the UE reports that the UE may support a fast processing time, the processing time may be a K symbol (e.g., K=1). However, when the UE reports that the UE may support a slow processing time, the processing time may be a P symbol (e.g., P=1) or a plurality of symbols. Alternatively, according to an UE capability, the UE may or may not apply an SFI in a current slot.

When the above scheme is applied, it is necessary to clearly define a resource to be transmitted by the group common PDCCH/DCI. The following options may be considered.

Option 1: a group common PDCCH/DCI may be transmitted only in a semi-statically configured DL resource. Therefore, the UE may know that a resource that should read the group common PDCCH/DCI is a DL resource.

Option 2: The UE may not make any assumption for a symbol to which an SFI is not applied, and may deal the symbol as a flexible resource by a semi-static slot format configuration. For example, the UE may determine that an SFI will not be transmitted in the resource. When the resource includes a CSI RS configuration, the UE cannot determine whether the resource is valid or invalid by an SFI transmitted through a group common PDCCH/DCI. When the UE determines that a CSI RS resource is valid in a flexible resource by the semi-static slot format configuration, the UE may determine that the CSI RS resource is valid even in a symbol to which an SFI is not applied. That is, the CSI RS configuration may follow an operation for a flexible symbol by the semi-static slot format configuration.

Alternatively, the UE may determine whether a resource transmitted by the group common PDCCH/DCI is valid or not by an SFI transmitted through the group common PDCCH/DCI. That is, a resource for a processing time of the group common PDCCH/DCI may be regarded as a resource in which the group common PDCCH/DCI is not received. For example, when a processing time is 1 symbol, it may be regarded that an SFI is not detected in a resource for a group common PDCCH/DCI and an additional 1 symbol. In this case, the same operation may be applied to a resource to which the group common PDCCH/DCI is transmitted. For example, when the UE does not perform measurement while monitoring a control channel, measurement may not be equally performed even in the corresponding resource.

Option 3: The UE may assume a resource transmitted by a group common PDCCH/DCI as a DL resource, unless the resource transmitted by a group common PDCCH/DCI is indicated as a UL resource by a previous SFI. Therefore, the CSI RS configuration may be valid in the corresponding resource. This is based on the assumption that an SFI may be detected only in a DL resource, and the network may be sure that a required processing time is also configured with DL resources. The UE may regard a resource transmitted by a group common PDCCH/DCI as a DL resource regardless of an actually indicated resource.

Alternatively, the processing time may be canceled. In general, cancellation of resources requires some processing time. For dynamic scheduling including a first resource opportunity in a semi-persistent scheduling (SPS) resource, the minimum time available for an SFI to change a resource direction of the resource may be determined by a processing time. The processing time may be any one of k0, k1, k2, or k2+uplink control information (UCI) processing time. When a resource direction is not changed, the UE may perform an expected operation. Further, when the SFI is available before k0 from a measurement resource n, the UE may perform or omit measurement according to the SFI. Further, when an SFI is available before k0 from a resource n for DL reception, the UE may omit DL reception.

When the UE does not obtain an SFI before a required processing time, the UE may recognize that the SFI is not available and may not perform an operation according to the SFI. Dynamic scheduling may always take precedence over a semi-static measurement configuration and may be canceled or activated. A first opportunity of a type 2 resource may follow UE specifically indicated dynamic resource/scheduling.

A BWP change may occur in association with an SFI. In this case, an effective time in which the BWP change occurs may be a time in which scheduling becomes effective.

In summary, the following may be proposed according to an embodiment of the present disclosure.

For dynamically indicated resources, when the SFI is not available at a time point of grant, a resource direction may not be changed.

The same symbol information obtained from the SFI may be applied to a semi-statically indicated DL resource. However, it is necessary that a processing time of the SFI is considered.

For semi-statically indicated UL resources (e.g., PUCCH, scheduling request (SR), CSI, grant-free resource, etc.), the SFI may be applied only when the resource is available before a required processing time. For example, the required processing time may be k2 for grant-free resources, k2 for CSI and/or a PUCCH for only CSI, and k2 for a PUCCH for a hybrid automatic repeat request (HARQ)-acknowledgement (ACK) for SR and/or SPS/CSI, and k1 may also be considered. That is, a processing time required in the UL may always be k2 or may be a maximum value of k1 and k2 according to the type of an UCI. Alternatively, the required processing time may be configured by the network.

It is necessary that delay for a processing time is clearly defined. Delay may be measured as a time between a time point t and a time n0. The time point t is a time point in which the UE finishes decoding of the SFI and in which the SFI is expected to be available. T may be determined as n0 (reception time point of SFI)+k3. k3 may be a minimum time between search spaces for monitoring the same DCI format in the same QCL relationship. Alternatively, k3 may be determined by a UE capability for processing a group common PDCCH/DCI and/or a UE capability for processing other PDCCH. The time point n0 is a time point in which the UE receives the SFI and in which the SFI becomes available.

To more simplify an operation, timing may be determined when scheduling DCI is received, and when the SFI is available, the scheduling DCI may be canceled. For semi-statically configured resources, the semi-statically configured timing may be different from a UE processing time. That is, for the CSI, the SFI should be available at least in a reference RS. For other signals, the UE default timing may be regarded as a processing time. That is, default timing used in initial access may be used for determining a processing time instead of a UE capability. Accordingly, all UEs may apply the same timing.

Each UE may have a different processing time, and thus, cancellation of resources may not be valid for any UE. To handle this, a group common PDCCH/DCI may be repeatedly transmitted in an overlapping portion. For example, a slot n may indicate a slot n+k from the slot n, and a slot n+k/2 may indicate a slot n+k+k/2 from the slot n+k/2. In this case, the starting point may be a current slot in which the group common PDCCH/DCI is received, and application of the SFI may vary according to the number of indicated slots.

2. Handling of Different Numerologies

When the UE receives a configuration of a plurality of BWPs, a group of a search space and/or CORESET in which the group common PDCCH/DCI is monitored may be configured differently. The UE may receive a configuration of different RNTI and index for each BWP in order to monitor the group common PDCCH/DCI. A monitoring period of the group common PDCCH/DCI may be individually configured for each BWP and/or may be combined and configured for each UE based on reference numerology. The reference numerology may be any one of numerology of the SS/PBCH block, numerology of the RMSI, and/or numerology of the group common PDCCH/DCI. Accordingly, starting from the system frame number (SFN) 0, the UE may monitor the group common PDCCH/DCI regardless of the BWP change.

An SFI transmitted through the group common PDCCH/DCI may be applied to indicated information regardless of numerology. For example, when an SFI for 10 slots is transmitted based on a subcarrier spacing of 15 kHz, and when the UE changes to a BWP having a subcarrier spacing of 30 kHz in the middle, the previously received SFI may be applied for 20 slots based on the subcarrier spacing of 30 kHz. Further, in a monitoring period of the same group common PDCCH/DCI, the UE may expect to receive a new SFI in the middle of 20 slots. A new SFI may additionally update a flexible symbol and/or a DL/UL symbol.

That is, the monitoring period of the group common PDCCH/DCI may be configured based on numerology of the group common PDCCH/DCI, and the same or different periods may be configured for each BWP. According to a configuration of the group common PDCCH/DCI and/or the SFI, the monitoring period of the group common PDCCH/DCI may be configured for each UE, and may be applied based on numerology of the group common PDCCH/DCI. When the network wants to use monitoring periods of different group common PDCCH/DCI for each BWP, a separate configuration may also be considered. Further, the monitoring period may be applied to puncturing indication (PI).

That is, the following may be considered.

The UE may receive a configuration of a monitoring period capable of defining different absolute times according to used numerology. The monitoring period may be determined based on numerology of the group common PDCCH/DCI. Alternatively, different SFI tables may be configured for each numerology while maintaining the same monitoring period. That is, different numbers of slots may be included for each numerology in one monitoring period.

The monitoring period may be applied from an SFN0 for given numerology, and wrap-around may occur in SFN=1024 or another SFN (e.g., SFN=10).

An SFI transmitted through the group common PDCCH/DCI may be applied in a plurality of slots and/or a time interval corresponding to a plurality of slots based on numerology used for transmission.

When the UE changes numerology and/or BWP in the middle, the UE may receive duplicate information.

Together with a set of search spaces that may potentially have different monitoring periods and/or offsets, a separate CORESET may be configured for each BWP.

When a BWP change occurs, it is necessary to clearly define whether to apply the group common PDCCH/DCI and/or a method of applying the group common PDCCH/DCI when the group common PDCCH/DCI is applied. The following options may be considered.

Option 1: An SFI received from the previous BWP may be valid even in the changed BWP. The SFI may be applied differently based on numerology of the changed BWP.

Option 2: An SFI received from the previous BWP may be ignored in the changed BWP. That is, it may be regarded as the group common PDCCH/DCI is not configured or as an error has occurred in which an SFI is not received.

When applying the SFI received at the previous BWP to the changed BWP, the following may be considered. In the following description, it will be described that an SFI based on numerology X is applied to a new BWP having numerology Y.

$$Y<X \text{ or } Y=X/k \text{ (e.g., X=30 kHz, Y=15 kHz, k=2)} \quad (1)$$

When the same number of SFIs are configured in a period of the n number of slots based on numerology X, and when the n/k number of slots correspond to numerology Y, the following options may be considered.

Option 1: A slot format applied to one slot based on numerology X may be directly applied to one slot based on numerology Y. That is, each symbol of one slot based on numerology X may be directly matched to each symbol of one slot based on numerology Y. In this case, when the SFI based on numerology Y is configured separately, the SFI for n−n/k number of slots need not be indicated. When one SFI is applied to both numerology X and Y, a slot corresponding to (n/k % k)=0 for numerology Y may carry an SFI of the slot based on the numerology Y. For example, a first slot (slot index 0) of the SFI based on numerology X may indicate the first slot based on numerology Y, and a k−1 slot of the SFI based on numerology X may not be used. This entry may be set to a default value such as "not applied". For example, when a SUL carrier using a subcarrier spacing of 15 kHz is indicated along with an unpaired carrier using a subcarrier spacing of 30 kHz, an entry of "not applied" for the SUL carrier may be used at every 2 slots.

Option 2: The number of slots may be different for different numerologies, n/k slots may be indicated for numerology Y, and n slots may be indicated for numerology X. An appropriate SFI entry may be selected from a table, and the multiple tables may have different periods. To support this, the same index of the SFI table may be interpreted differently for each numerology. The UE may receive a configuration of a separate SFI entry for each numerology. For the same SFI entry, the number of slots indicated according to numerology may be different. Starting from a slot to which the group common PDCCH/DCI is transmitted, the different number of slots may be indicated.

Option 3: The SFI of numerology Y may be based on numerology X. In this case, the k number of DL symbols in numerology X may be converted into DL symbols in numerology Y. The same is applied to UL symbols or flexible symbols. When the k number of symbols include DL symbols and flexible symbols in numerology X, the k number of symbols may be converted to DL symbols or flexible symbols in numerology Y. UL symbols or flexible symbols may be similarly processed. Further, when the k number of symbols include DL symbols and UL symbols in numerology X, it may be regarded that the k number of symbols are converted to flexible symbols or that an error has occurred in numerology Y. For example, when X=30 kHz and Y=15 kHz, and when a DL or UL symbol is indicated in numerology X, it may be regarded as a DL or UL symbol for the same symbol in numerology Y. That is, when a slot format of a slot 0 is configured with "D . . . XD . . . U" having two transform points in numerology X, "DX", "XD", "UX", and "XU" in numerology X may be indicated to a DL symbol, a DL symbol, a UL symbol, and a UL symbol, respectively, in numerology Y.

That is, an SFI for the k number of symbols in numerology X may be applied to one symbol in numerology Y. When the k number of symbols in numerology X include a DL symbol or a UL symbol, one symbol may be regarded as a DL symbol or UL symbol in numerology Y. Alternatively, when the k number of symbols include a flexible symbol in numerology X, one symbol may be regarded as a flexible symbol in numerology Y. When the k number of symbols include a DL symbol and a UL symbol in numerology X, the k number of symbols may be regarded as an invalid SFI entry.

However, an unsupported SFI may thus occur in a configured SFI entry of an SFI format. That is, a converted SFI entry applied to numerology Y may not be in the SFI table. For example, when an SFI indicates "DDDDDDDDDD U . . . U" for numerology X, the corresponding SFI may indicate "DDDDDXXU . . . U" for numerology Y, and a converted SFI may or may not be supported by the SFI table. That is, the SFI interpreted in numerology Y may not be in the SFI, which may be regarded as an error has occurred.

Alternatively, in order to cover the converted SFI, the SFI table may include all of mappings of SFI interpreted in numerology Y. For example, an SFI including two transform points at a subcarrier interval of 30 kHz may correspond to an SFI including four transform points at a subcarrier interval of 15 kHz. This SFI may not be supported or may be supported by the SFI table.

Alternatively, the above mechanism may not be used for a specific SFI (e.g., including two transform points). The above-described option 1 or option 2 may be applied to the SFI. Further, there is no efficient mechanism for indicating two transform points in numerology Y by the SFI based on numerology X. In order to support this, one transform point may be indicated into two slots in numerology X. Accordingly, two slots may be indicated for numerology Y, or different SFI tables may be applied for numerology Y.

Option 4: A separate SFI table may be configured for each numerology. In particular, an SFI of a carrier based on numerology Y may be indicated by the same index as other carriers and/or SFIs based on numerology X. In this case, even in the same index, it may be interpreted differently by constituting a separate SFI set (number of SFIs and slots) for each entry between numerology X and Y. When the DL and the UL use different numerologies in a paired spectrum, for example, two slots of numerology X and one slot of numerology Y may be configured. A similar method may be applied even to a case of the SUL carrier. That is, when different numerologies is used in the paired spectrum and the SUL carrier, each entry may be configured with the k number of slots of numerology X and one slot of numerology Y for each SFI.

Option 5: Regardless of where the SFI is indicated, the slot format may be determined based on the numerology Y. This is similar to a configuration of a separate SFI table for each numerology of option 4. Alternatively, a separate entry may be used for each numerology, and each entry may indicate the different number of slots according to numerology.

$$Y>X \text{ or } Y=X*k \text{ (e.g., X=15 kHz, Y=30 kHz, k=2)} \quad (2)$$

When the same number of SFIs are configured in a period of then number of slots based on numerology X, and when the n*k number of slots correspond to numerology Y, the following options may be considered.

Option 1: A slot format applied to one slot based on numerology X may be directly applied to one slot based on numerology Y. That is, each symbol of one slot based on numerology X may be directly matched to each symbol of one slot based on numerology Y. In this case, when the SFI based on numerology Y is configured separately, it is unnecessary that an SFI for the n−n/k number of slot is indicated. For the remaining n*k-n slots, the indicated SFI may be repeatedly applied.

Option 2: The number of slots may be different for different numerologies, n/k slots may be indicated for numerology Y, and n slots may be indicated for numerology X. The appropriate SFI entry may be selected from the table, and the multiple tables may have different periods.

Option 3: An SFI of numerology Y may be based on numerology X. In this case, a DL symbol in numerology X may be converted into the k number of DL symbols in numerology Y. The same is applied to UL symbols or flexible symbols. That is, an SFI for one symbol in numerology X may be applied to the k number of symbols in numerology Y. However, an unsupported SFI may thus occur in a configured SFI entry of an SFI format. That is, the converted SFI entry applied to numerology Y may not be in the SFI table. For example, if the SFI indicates "DDDDDDDDDXXXXX" for numerology X, the corresponding SFI may indicate "DDDDDDDDDDDDDDDDDD" for numerology Y If the converted SFI is not in the SFI table, it may be regarded that an error has occurred.

Alternatively, in order to cover the converted SFI, the SFI table may include all of mappings of SFIs interpreted in numerology Y. In this case, because there may not be two transform points within 7 symbols, there is no efficient mechanism that supports two transform points. In order to support this, special mapping between numerology X and Y may be configured. When the corresponding entry is selected by numerology X, another SFI may be applied to numerology Y. For example, when "DDXXXXU" is indicated by numerology X, it may be mapped to an SFI having two transform points in numerology Y.

Option 4: A separate SFI table may be configured for each numerology. In particular, the SFI of a carrier based on numerology Y may be indicated by the same index as that of other carriers and/or SFIs based on numerology X. In this case, even in the same index, it may be interpreted differently by configuring a separate SFI set (number of SFIs and slots) for each entry between numerology X and Y. When the DL and UL use different numerologies in a paired spectrum, for example, one slot of numerology X and two slots of numerology Y may be configured. A similar method may be applied to the SUL carrier. That is, when different numerologies are used in the paired spectrum and the SUL carrier, each entry may be configured with one slot of numerology X and the k number of slots of numerology Y for each SFI.

Option 5: Regardless of where the SFI is indicated, the slot format may be determined based on numerology Y. This is similar to a configuration of a separate SFI table for each numerology of option 4. Alternatively, a separate entry may be used for each numerology, and each entry may indicate the different number of slots according to numerology.

When the SFI is valid even after the BWP change, and any one of the above-described options 2, 4, and 5 is used, the network should be able to ensure consistency between numerology of the BWP before the change and numerology of the BWP after the change. In this case, when information is different, it may be regarded that an error has occurred. The UE may skip the SFI and process the resource as if the SFI has not been received.

3. SUL and Cross Carrier/Cross BWP Processing

In an FDD, separate SFIs may be indicated for DL carriers and UL carriers. That is, in the paired spectrum, the SFI may be transmitted for each of the DL carrier and the UL carrier. When the DL carrier is associated with two UL carriers or when a plurality of DL carriers are associated with one UL carrier, it is necessary that the SFI is clearly defined. Hereinafter, the following may be considered.

(1) Unpaired spectrum without SUL (i.e., spectrum without SUL)

DL bandwidth and UL bandwidth to which the SFI is applied may be configured. The UE may receive a configuration of a BWP belonging to a configured bandwidth to which the SFI may be applied.

When the unpaired spectrum configures a single carrier that covers the DL bandwidth and the UL bandwidth, the SFI may be applied to the corresponding carrier. When only a DL bandwidth is configured for the UE (i.e., the carrier in which only a DL is present in the unpaired spectrum/UL resource is not used), the UL resource may be handled as a flexible resource.

(2) Paired spectrum without SUL

DL bandwidth and UL bandwidth to which the SFI is applied may be configured. The UE may receive a configuration of a BWP belonging to a configured bandwidth to which the SFI may be applied.

The SFI may be applied to the DL and the UL based on a duplex gap in a band.

Regardless of bandwidth information, a separate SFI for a DL spectrum and a UL spectrum may be configured. Alternatively, only an SFI for a DL carrier may be configured.

One SFI may cover both DL/UL spectrum. In this case, the group common PDCCH/DCI may include different SFIs for two cases of a paired spectrum and an unpaired spectrum. For example, each SFI may include an SFI for the DL spectrum and an SFI for the UL spectrum. That is, the size of a payload of the SFI may be twice of the number of slot formats for the DL spectrum and the UL spectrum. A SFI table may include both SFIs of the DL spectrum and the UL spectrum.

(3) SUL band

When an unpaired NR carrier is associated with an FDD SUL carrier, the following may be considered.

Under the assumption that the FDD SUL carrier has only UL resources, the SFI may indicate only a DL spectrum of the unpaired NR carrier.

Separate SFIs may be configured for an unpaired NR carrier and an FDD SUL carrier. Each SFI for an unpaired NR carrier and an FDD SUL carrier may be transmitted in the same DL spectrum by cross carrier indication of the SFI.

One SFI may simultaneously indicate an unpaired NR carrier and an FDD SUL carrier. For example, an SFI for an unpaired NR carrier and an SFI for an FDD SUL carrier (e.g., UL symbols or flexible symbols) may be combined and indicated for each slot. To this end, it is necessary that the UE knows by a configuration whether the SFI includes an SFI for the FDD SUL carrier. Basically, the UE may expect the SFI for the unpaired NR carrier to be broadcast, and when selectively configured, the SFI for the FDD SUL carrier may be delivered.

When the paired NR carrier is associated with the FDD SUL carrier, the same scheme as above may be applied.

When a paired/unpaired NR carrier is associated with a TDD SUL carrier, the slot format may be complicated in the TDD SUL carrier. In the TDD SUL carrier, a slot format including DL/UL/flexible symbols may be reused, and one SFI may include both an SFI for a paired/unpaired NR carrier and an SFI for a TDD SUL carrier. Alternatively, separate SFIs may be configured for a paired/unpaired NR carrier and a TDD SUL carrier. The SFI for the TDD SUL carrier may be transmitted in the DL spectrum of the paired/unpaired NR carrier, as in the SFI scheduled by the cross carrier. In the SFI for the TDD SUL carrier, only UL symbols or flexible symbols may be used, and may be configured with valid resources to the UE. Because the UE will not access the DL carrier associated with the TDD SUL carrier, there is no need to know the SFI for the corresponding DL carrier.

In summary, the SUL carrier may be treated as a separate carrier, as in the case of the paired spectrum, in terms of SFI transmission and/or other group common transmission, and may be treated as if there is a cross carrier indication in SUL transmission. Alternatively, the carrier associated with the SUL carrier may carry the SFI of the two carriers, as in a single SFI entry. To this end, a set of different SFIs may be indicated. For example, an SFI indicating a DL/UL/flexible symbol for an NR carrier and an SFI indicating an UL/flexible symbol for a SUL carrier may be transmitted through a carrier associated with the SUL carrier. Alternatively, it may be assumed that all resources of the SUL carrier are basically UL resources. All resources of the SUL carrier may be UL resources, unless otherwise indicated by a semi-static configuration and/or a dynamic SFI.

4. DRX and Default BWP Processing

In a DRX or idle state, the UE does not need to monitor the SFI. When the UE receives a configuration of a CORESET for the group common PDCCH/DCI in the default BWP, the UE may monitor a group common PDCCH/DCI during on-duration of DRX. Otherwise, the UE does not need to monitor the group common PDCCH/DCI in the default BWP. The condition for the UE to return to the default BWP may be any one of the following.

Option 1: When the UE does not receive DCI scheduling unicast DL, and there is no active DL SPS Option 2: When the UE does not receive DCI scheduling a unicast DL/UL and there is no active DL/UL SPS (because the default BWP may have a limited bandwidth in receiving grant, it is to ensure a larger BWP for UL grant reception)

Option 3: When the UE does not receive DCI scheduling unicast DL/UL

Option 4: When the UE does not receive DCI scheduling unicast DL

When a CORESET for the group common PDCCH/DCI is not configured in the default BWP, the UE may assume and operate that the group common PDCCH/DCI is not configured.

5. Multi-Slot (or Multi-Mini-Slot) Scheduling and Group Common PDCCH/DCI

In scheduling data and/or control signals in multi-slots (or multi-mini-slots), operations related to actual slots to which repetitive transmissions are mapped need to be clearly defined. Further, when reserved or unavailable or conflicting resources are in a slot or a part of a slot, a method of handling the resources also needs to be clearly defined. In the following description, slots or multi-slots may be replaced with mini-slots or multi-mini-slots.

In determining a start point and an end point (i.e., corresponding to the number of actual slots) of a slot in which repetition may occur, the following may be considered.

Regardless of a valid slot in which repetition may occur, the start point and the end point of a slot in which repetition may occur may be determined by a start resource and repetition. The starting resource may be indicated by DCI. Accordingly, when any repetition is omitted in the middle of a plurality of slots, the number of repetitions may be reduced.

Only valid slots in which repetition may occur may be considered. A slot indicated first by the DCI may always be considered as valid, even if the slot may be canceled by the SFI.

For repetitive transmission in a multi-slot, when only a semi-static DL/UL slot format configuration is given and no group common PDCCH/DCI is given, repetitive transmission in a multi-slot may be transmitted in a slot including a sufficient UL symbol or flexible symbol corresponding to resources allocated for multi-slot transmission. Alternatively, repetitive transmission in the multi-slot may be transmitted only in UL symbols except for the flexible symbol.

When the semi-static DL/UL slot format configuration and the group common PDCCH/DCI are configured, repetitive transmission in the multi-slot may be transmitted in a slot including sufficient UL symbols corresponding to resources allocated for multi-slot transmission. Alternatively, repetitive transmission in the multi-slot may be transmitted based on the group common PDCCH/DCI, unless the resource is designated as a DL symbol (or flexible symbol) and canceled by a semi-static DL/UL slot format configuration.

When only a group common PDCCH/DCI is configured, repetitive transmission in a multi-slot may be transmitted in a slot including sufficient UL symbols corresponding to resources allocated for multi-slot transmission. Alternatively, repetitive transmission in the multi-slot may be transmitted based on the group common PDCCH/DCI.

In other cases, repetitive transmission in multiple slots may be performed in any slot.

For a PUCCH resource dynamically indicated by DCI, if a semi-static DL/UL slot format configuration is available, the multi-slot PUCCH may start from a start symbol indicated by PUCCH resource allocation, and be transmitted in a slot including the N number or more of UL symbols and/or flexible symbols. When the semi-static DL/UL slot format configuration is not available, the multi-slot PUCCH may be transmitted in any slot according to scheduling.

For a semi-statically configured PUCCH resource, if a group common PDCCH/DCI is not configured and a semi-static DL/UL slot format configuration is available, the multi-slot PUCCH may start from a start symbol indicated by PUCCH resource allocation and be transmitted in a slot including the N number or more of UL symbol and/or flexible symbol. When the group common PDCCH/DCI is configured, the multi-slot PUCCH may be transmitted in a slot including the N number or more of UL symbols, starting from a start symbol indicated by PUCCH resource allocation. In other cases, the multi-slot PUCCH may be transmitted in any slot according to scheduling.

For a method of counting and/or processing the k number of repetitions, the following may be considered.

Option 1: For a dynamic SFI, the absolute number of slots may be considered regardless of whether transmission is omitted. For a semi-static DL/UL slot format configuration, the number of slots in which transmission is actually performed may be considered.

Option 2: For both dynamic SFI and semi-static DL/UL slot format configurations, the absolute number of slots may be considered regardless of whether transmission is omitted.

Option 3: For both dynamic SFI and semi-static DL/UL slot format configurations, the number of slots in which transmission is actually performed may be considered.

Option 4: For a dynamic SFI, the number of slots in which transmission is actually performed may be considered. For a semi-static DL/UL slot format configuration, the absolute number of slots may be considered regardless of whether transmission is omitted.

The above-described option 4 may be described as follows. That is, repetition may be delayed in a slot (e.g., when a DL symbol exists) that cannot be transmitted by a semi-static configuration, whereas repetition may be omitted in a slot that cannot be transmitted by dynamic SFI.

A similar mechanism may also be applied to rate matching. Rate matching may be treated as if it is a semi-static operation, and rate matching resources may also be treated as in a semi-static slot format configuration. For rate matching resources that may be dynamically indicated, rate matching may be omitted or performed. That is, when the rate matching resource is configured with UL resources, repetition may be omitted when there are insufficient resources due to rate matching. When the rate matching resource is configured with UL resources, rate matching may be performed.

For multi-slot PUCCH scheduling, for a PUCCH, when a length of the PUCCH is K and a start symbol of each slot is i, if there are(is) an UL symbol and/or a flexible symbol between an i-th symbol and an (i+K)-th symbol in each slot, the UE may perform PUCCH transmission in the corresponding slot.

For multi-slot PUSCH scheduling, the following may be considered. The following may be similarly applied to multi-slot PUCCH scheduling.

Option 1: A scheme similar to the above-described multi-slot PUSCH scheduling may be applied.

Option 2: To support only continuous time domain PUSCH transmission, the PUSCH may be transmitted in a slot having consecutive UL symbols and/or flexible symbols of the number smaller than K as long as the DM-RS may be transmitted. That is, the PUSCH transmission segment may be shorter than K.

Option 3: Only PUSCH transmission may be discontinuous in the time domain. The PUSCH may be transmitted in a slot as long as the DM-RS may be transmitted in UL symbols and/or flexible symbols. That is, the PUSCH transmission segment may be the same as K.

For a PUCCH and a PUSCH, the last 1 or 2 symbols may be punctured or rate matched. This may be supported by a semi-static rate matching resource configuration and/or a semi-static slot format configuration and/or a dynamic SFI. For example, the UE may transmit a PUCCH/PUSCH in a semi-statically configured UL resource, and the UE may transmit a PUCCH/PUSCH in a slot including the number of symbols more than the K number of UL symbols and/or the K−2 number of UL symbols, starting from symbols indicated for the PUCCH/PUSCH.

6. Time domain resource allocation in a single slot, a multi-slot, a single mini-slot, and/or a multi-mini slot considering a rate matching resource and/or a semi-static slot format configuration and/or dynamic SFI There may be various types of scheduling, such as resource allocation by a semi-static configuration such as a type 1/2, PUCCH resource allocation by a semi-static configuration, or resource allocation dynamically indicated by DCI, and each scheduling may include different time domain scheduling information. Further, time domain scheduling information may be applied differently in a DL and a UL. Further, according to where the time-domain scheduling information is scheduled (e.g., MSG3 or other unicast transmission), time-domain scheduling information applied by the UE may be different. That is, different application of time domain scheduling information may be required according to the message.

First, various behavior options may be classified and what are possible combinations may be discussed. For discussion, resources may be classified into fixed DL symbols and fixed UL symbols indicated by a cell specific slot format configuration and/or a UE specific slot format configuration. For messages in which the UE is not identified (e.g., broadcast message such as RMSI or MSG3), a UE specific slot format configuration may not be available. Further, when the group common PDCCH/DCI is not configured, resources may be designated as flexible symbols. When a flexible symbol is indicated to a DL symbol or a UL symbol by an SFI transmitted through a group common PDCCH/DCI, the flexible symbol becomes a fixed DL symbol and a fixed UL symbol. A flexible symbol that may not be known by an SFI may be regarded as a reserved resource. Similarly, a rate matching resource by a semi-static rate matching resource configuration may be regarded as a reservation resource. The rate matching resource by dynamic indication may regard only data scheduled by the same DCI that dynamically indicates the rate matching resource as a reserved resource.

A set of resources in which the UE should transmit one transport block (TB) may be defined as a transmission opportunity. In the case of dynamic single slot scheduling, the transmission opportunity may be defined to a start symbol and duration of the slot. Similarly, in the case of a mini-slot, the mini-slot scheduling interval/time-domain resource may be defined as a start symbol and duration of the mini-slot according to an allocation method. In the case of a multi-slot or a multi-mini slot, there may be a plurality of transmission opportunities by one scheduling and/or one transmission period. When a dynamic SFI or a semi-static slot format is not configured, all resources may be regarded as flexible symbols.

Further, counting may be applied to a window of control channel monitoring such as RMSI/other SI (OSI)/random access response (RAR). Further, counting may be applied to determine/derive resources at dynamically and/or semi-statically configured offsets between control signals and data and/or between data and UCI and/or between grant and operation. The first transmission opportunity indicated by the DCI may always be regarded as valid regardless of an SFI.

For the remaining transmission opportunities indicated by the DCI, the same restrictions may be repetitively applied to semi-statically configured resources so that the first transmission opportunity is always transmitted. Alternatively, the semi-statically configured resource may be regarded as the remaining transmission opportunity. In this case, when the DCI has a higher priority than the SFI and a lower priority than that of the semi-static slot format configuration, the DCI may be applied only to the first transmission opportunity, and the other transmission opportunities may be processed differently. Alternatively, the DCI may be applied to all resources. Likewise, even in the case of semi-statically configured resources, at least a first transmission opportunity should be protected. That is, in the case of a type 1 or a type 2, the first transmission opportunity at every period P may be always regarded as a valid resource regardless of an SFI, unless it is indicated to a DL symbol by a semi-static slot format configuration.

Hereinafter, various aspects of time-domain resource allocation in a single slot, a multi-slot, a single mini-slot, and/or a multi-mini slot considering a rate matching resource, a semi-static slot format configuration, and/or a dynamic SFI will be described.

(1) UE operation

When a transmission segment is K based on time-domain resource allocation in a slot or a mini-slot, a transmission opportunity may be regarded as valid. In this case, the following may be considered.

Option 1: The resource may include the consecutive K number of UL symbols or flexible symbols for UL transmission. Alternatively, the resource may include the consecutive K number of DL symbols or flexible symbols for DL transmission.

Option 2: The resource may include the consecutive K1 number of UL symbols or flexible symbols for UL transmission. Alternatively, the resource may include the consecutive K1 number of DL symbols or flexible symbols for DL transmission. In this case, K1 may be equal to or less than K. K1 may be configured by a network or may be fixed as K1=K−2 or K1=K−1.

Option 3: As long as the DM-RS resource is a UL symbol and/or a flexible symbol in a UL or the DM-RS resource is a DL symbol and/or a flexible symbol in a DL, the resource may be regarded as a valid resource.

Option 4: The corresponding resource may always be regarded as a valid resource. For example, the first transmission opportunity indicated by the DCI at every period P or the first transmission opportunity of the type 1 or type 2 resource of grant-free resource allocation at every period P may always be regarded as a valid resource.

Otherwise, the transmission opportunity may be regarded as invalid.

(2) Counting for repetition

Option 1: Counting may be performed only in valid transmission opportunities.

Option 2: Counting may be performed in all transmission opportunities regardless of whether the transmission opportunities are valid.

Option 3: Counting may be performed only at valid transmission opportunities that may be determined based on only a semi-static slot format configuration and/or a semi-static rate matching resource configuration. That is, counting may be omitted in an invalid transmission opportunity induced by the semi-static slot format configuration.

(3) Redundancy version (RV) sequence mapping

Option 1: The RV sequence may be mapped only at valid transmission opportunities.

Option 2: The RV sequence may be mapped in all transmission opportunities regardless of whether the transmission opportunities are valid.

Option 3: The RV sequence may be mapped only in the counted resource.

Option 4: When the type 1 or type 2 resource is configured together with repetition, if transmission is started from a transmission opportunity other than an initial transmission opportunity, the RV sequence may be mapped as if transmission is performed from an initial transmission opportunity in order to reduce ambiguity.

(4) Reliability treatment

Other operations may be considered according to the reliability requirements. In the case where reliability is important, it may be configured to count transmission opportunities in which transmission is actually performed, whereas in a normal case, it may be configured to count all valid transmission opportunities, and in a spectrum efficiency mode, it may be configured to count all transmission opportunities regardless of whether resources are valid.

To handle coverage and/or reliability requirements, repetitive transmissions may be configured for grant-free resources and/or grant-based transmissions. Due to invalid resources, in a particular case, it may be difficult to ensure that the UE may transmit the configured number of repetitions. In order to enable the UE to transmit the allowed number of repetitions, the UE may delay transmission when dynamically indicated/configured or semi-statically configured. This is similar to counting only transmission opportunities in which transmission has actually been performed. That is, the UE may be configured with different counting mechanisms according to the situation. Grant-free resources may be configured semi-statically.

Further, when the UE is configured to have a larger period so as to receive potential repetition, if only transmission opportunity is counted in which transmission is delayed and/or transmission has been actually performed, the delayed transmission may be overlapped and transmitted with the transmission opportunity of the next period. Therefore, delay of transmission may be allowed only within a period of a resource configuration of a type 1/2.

In the type 1/2 resource, a first transmission opportunity (a case that may transmit at any transmission opportunity within the period P) that may be transmitted by the UE may not be valid. In this case, when the first transmission opportunity is associated with RV=0, the UE may skip transmission at the first transmission opportunity and start transmission at the next transmission opportunity in which the transmission opportunity is valid and that may be mapped to RV=0. When counting is configured to be aligned with transmission, counting may be performed from the corresponding time point.

Alternatively, when it is assumed that the network may appropriately handle a buffer, any RV sequence determined based on a resource or counting may be used, and the UE may start transmission at any time.

Alternatively, the semi-static repetition number may be configured to twice of the actual expected repetition number at which the UE may start transmission, as long as the transmission may exceed the expected repetition number. However, this may limit the available HARQ processes.

Alternatively, when an UE operation for dynamic SFI processing is determined to omission of transmission, the UE may start transmission from anywhere regardless of the RV sequence. When an UE operation for dynamic SFI processing is determined to delay of transmission, the UE may start transmission only at the first transmission opportunity.

(5) Inter-slot hopping and/or inter-mini-slot hopping

Option 1: Inter-slot hopping and/or inter-mini-slot hopping may be performed only at counted transmission opportunities.

Option 2: Inter-slot hopping and/or inter-mini-slot hopping may be performed at all transmission opportunities regardless of whether actual transmission. Accordingly, inter-slot hopping and/or inter-mini-slot hopping may be performed less or may not be performed in some cases.

Option 3: Inter-slot hopping and/or inter-mini-slot hopping may be performed only at transmission opportunities in which actual valid transmission has been performed. In this case, when the network and the UE determine differently for valid resources, ambiguity may occur between the network and the UE.

(6) Intra-slot hopping

Option 1: At a valid transmission opportunity that may have transmission duration different from duration indicated by DCI or a semi-static configuration, intra-slot hopping may be performed based on the actual transmission time.

Option 2: Regardless of an actual transmission time, intra-slot hopping may always be performed based on duration indicated by DCI or semi-static configuration.

(7) Determination of candidate transmission opportunity in a type 1 or type 2 resource configuration: The candidate transmission opportunity may or may not be valid by the above-described "(1) UE operation".

Option 1: The transmission opportunity may start at a slot derived from a period and offset for the Nth period, and the first transmission opportunity in the corresponding slot may be determined by time domain resource allocation. For example, when the period is 2 slots and the offset is 1, in order to determine a transmission opportunity, resource allocation may be applied at every odd slot.

When the repetition is K>1, the remaining transmission opportunities may be determined as follows. First, when the time domain resource is for non-slot based scheduling (similar to DL, a DM-RS type or other indication for distinguishing the two needs to be indicated in the time domain resource entry), the slot may be divided into the M number of non-slots, where M is floor (14/U), and U is a value (equal to or greater than duration) closest to a size of non-slot scheduling in duration of the indicated resource. For example, if the resource duration is 1 symbol, U is 2 symbols, and if the resource duration is 5 symbols, U is 7 symbols. If the resource duration is 4 symbols, the non-slot may be configured with slots 0 to 11 and/or slots 2 to 14 according to the configuration. Alternatively, the same resource allocation may be applied to each non-slot unit, and may be applied within a start symbol non-slot unit of the indicated time domain resource. For example, when there are two non-slot units including 7 symbols in a slot, and when the start symbol is indicated as 2 together with resource duration of 5 symbols, a symbol 2 and a symbol 9 may be regarded as a potential start symbol in each non-slot unit. Alternatively, in the case of slot-based scheduling, the same start and duration may be applied to each slot through repeated slots.

Option 2: In the case of slot-based scheduling, the same method as option 1 may be applied. In the case of non-slot based scheduling, time domain resource allocation may include one or more non-continuous resource allocation of non-slot scheduling. For example, in order to represent duration of 5 symbols of 2 non-slots in 1 slot, time domain resource allocation may be '00111110011111'. However, this may not be represented by continuous time domain resource allocation, and may not represent continuous repetition of non-slot scheduling.

Option 3: Regardless of duration, repetition may occur only over several slots. That is, repetition may be variable only when a period is larger than a slot. When the period is smaller than a slot of the number of repetitions 1, a method similar to non-slot scheduling in the above-described option 1 may be applied so as to have multiple transmission opportunities during duration. In this case, the non-slot scheduling unit may be determined by a period rather than being selected by time domain resource allocation.

For a plurality of transmission opportunities in the period P, a size of a non-slot scheduling unit and/or a pattern of the non-slot scheduling unit may be indicated. For example, even if the duration is 1 symbol, a size of the non-slot scheduling unit may be configured with 7 symbols instead of 2 symbols, and there may be two transmission opportunities in the slot. This may be configured separately for a type 1 or type 2 configuration.

(8) Actual transmission and/or reception

Option 1: Transmission may occur only in valid resources, and reception may occur only in valid resources.

Option 2: Transmission may occur only in valid resources, and reception may occur in counted resources.

Option 3: Transmission may occur in a counted resource, and reception may also occur in a counted resource.

Table 4 summarizes various processes in order to assure flexibility and/or reliability while minimizing ambiguity between the UE and the network.

TABLE 4

| | |
|---|---|
| RMSI CORESET/ PDSCH | Monitored as configured by PBCH (There is no influence from semi-static slot format configuration or semi-static rate matching resources) |
| OSI CORESET/ PDSCH | If the semi-static slot format configuration is available, monitoring may be omitted in the UL resource (i.e., at least for CORESET, option 1 of "(1) UE operation") In the case of RMSI PDSCH that may be potentially repeated, option 1 or option 3 of "(1) UE operation" may be used. The monitoring window is not affected by this. That is, option 2 of "(2) counting for repetition" may be used for counting of the monitoring window. In the case of RMSI PDSCH repetition counting, option 1 or option 3 of "(1) UE operation" may be used. RV sequences may occur only in counted resources. |
| RAR CORESET/ PDSCH | Processing similar to OSI CORESET/ PDSCH However, as the UE has multiple ULs in one RAR window, if an RAR reception performance may be degraded, option 1 of "(2) counting for repetition" may be used based on a semi-static slot format configuration, if available. The starting position of the RAR window may be determined according to option 2 of "(2) counting for repetition". Alternatively, the start position of the RAR window may be determined according to option 1 of "(2) counting for repetition", and the RAR window may use option 1 of "(2) counting for repetition". Alternatively, both the RAR window and the starting position of the RAR window may be determined according to option 2 of "(2) counting for repetition" according to an appropriate configuration. Because an RAR may not exist for all beams, option 2 of "(2) counting for repetition" may provide more flexibility. The first resource in option 1 of "(2) counting for repetition" may not be valid. |
| MSG3 transmission/ reception | Timing K2 from UL grant to a PUSCH may be determined according to option 2 of "(2) counting for repetition". That is, the absolute number of slots may be counted in slot-based scheduling, and the absolute number of transmission opportunities may be counted in mini-slot-based scheduling. Actual transmission or repetition may be performed based on option 3 or option 2 of "(2) counting for repetition". (If dynamic SFI is not configured, both are the same for MSG3) See the following note 1 |
| MSG4 CORESET/ PDSCH | The same processing as RAR CORESET/PDSCH |
| PUCCH for MSG4 | The same processing as MSG3 transmission/ reception See the following note 2 |
| Paging CORESET/ PDSCH | The same processing as OSI CORESET/PDSCH |
| unicast by USS | Option 3 of the above "(2) counting for repetition" |

TABLE 4-continued

| | |
|---|---|
| Fallback by CSS | The same processing as RAR CORESET/PDSCH or MSG4 CORESET/PDSCH |

Note 1:

A case of UE group common transmission and/or cell specific transmission and/or when the UE is not identified or when transmission is not C-RNTI based transmission, it may be regarded as a group common PDCCH/DCI is not configured and a UE specific slot format configuration is unavailable. When a cell-specific slot format configuration is delivered through OSI, the cell-specific slot format configuration may be regarded as unavailable until OSI transmission. The same handling is required regardless of whether the UE is a CONNECTEC mode or an IDLE mode. Accordingly, the same handling may be applied regardless of when the UE receives a specific channel (i.e., regardless of whether the UE is in IDLE mode or a CONNECTED mode). Alternatively, different operations may be applied according to which a BWP is read. For example, regardless of the UE state, the channel of the initial BWP follows the same handling, whereas the channel of the BWP other than the initial BWP may be handled differently. For example, when the OSI transmits a cell-specific slot format configuration, for RMSI CORESET/PDSCH in the BWP other than the initial BWP, a fixed UL symbol may be omitted in counting and/or repetition. This operation may be different for each BWP. That is. when determining a valid resource, information applied in each BWP may be different. For the initial DL/UL BWP, the same information as the initial access procedure may be applied. For other DL/UL BWP, the UE may receive a cell specific slot format configuration through OSI as well as a UE specific slot format configuration. Alternatively, whether which information is available to determine validity of the transmission opportunity may be determined for each channel listed in Table 4 regardless of the BWP to which the channel is transmitted. For a fallback operation, the UE may not consider a UE specific slot format configuration and/or a group common PDCCH/DCI when determining a valid transmission opportunity. That is, only a cell specific slot format configuration may be considered.

Note 2:

Until the UE is reconfigured to another BWP, the UE may use the initial DL/UL BWP for transmission. In the case of a PUCCH for MSG4, it is preferable that a valid transmission opportunity is determined based on only a cell specific slot format configuration. After receiving a UE specific slot format configuration, the UE may also apply a UE specific slot format configuration. However, ambiguity may thus occur in the RRC (re)configuration step. Therefore, it is preferable that only a cell specific slot format configuration is applied to the initial DL/UL BWP regardless of availability of other information such as a UE specific slot format configuration or a group common PDCCH/DCI. The same method may be applied even to the default BWP, and the default BWP may be used for a reconfiguration.

Alternatively, for control signals/data configured in CSS regardless of a BWP, only a cell-specific slot format configuration may be commonly applied to all UEs. That is, a UE specific slot format configuration or a group common PDCCH/DCI is not considered. This may be especially necessary for MSG3 transmission. When data delay or data omission is used in conflicting resources, only a cell specific slot format configuration available for control signals/data associated with CSS (e.g., RMSI PDSCH, OSI PDSCH, RAR PDSCH, MSG3, MSG4, PUCCH for MSG4, etc.) may be used for determining conflicting resources.

Figure 9:
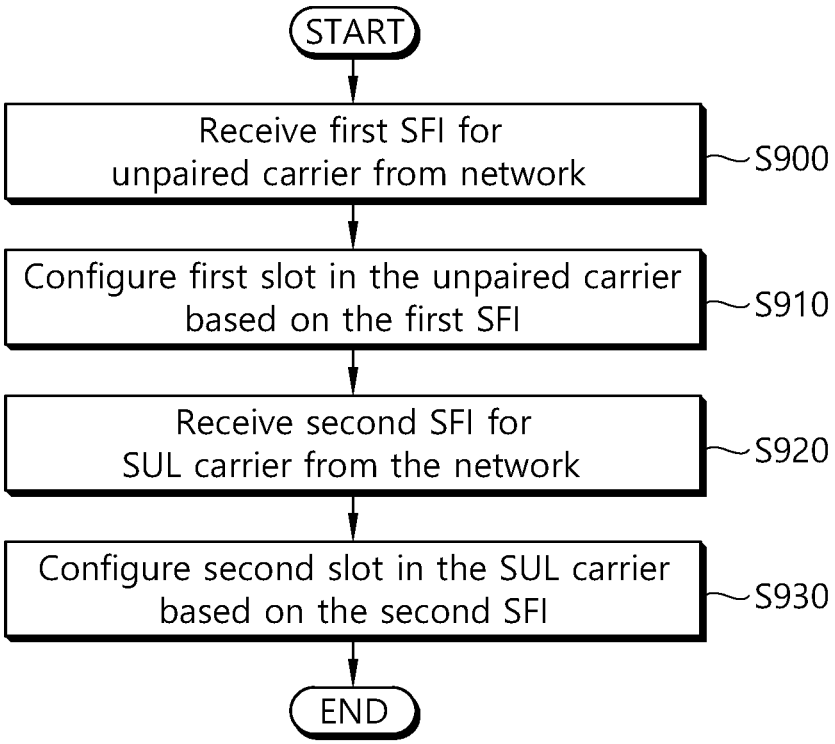
FIG. 9 shows a method in which an UE operates according to an embodiment of the present disclosure.

FIG. 9 shows a method in which an UE operates according to an embodiment of the present disclosure. The present disclosure described above at the UE side may be applied to this embodiment.

In step S900, the UE receives a first SFI for an unpaired carrier from a network. In step S910, the UE configures a first slot in the unpaired carrier based on the first SFI. Further, in step S920, the UE receives a second SFI for a SUL carrier from the network. In step S930, the UE configures a second slot in the SUL carrier based on the second SFI. The first SFI and the second SFI are separate information.

The first SFI and the second SFI may be received through the same DL spectrum. The same DL spectrum may be a DL spectrum of the unpaired carrier. The DL spectrum of the unpaired carrier may be associated with the SUL carrier. The SUL carrier may use an FDD.

According to an embodiment of the present disclosure described in FIG. 9, when the unpaired NR carrier and the FDD SUL carrier are associated, an SFI applied to the unpaired NR carrier and an SFI applied to the FDD SUL carrier may be separately configured. Accordingly, a slot format may be effectively configured in each carrier.

Figure 10:
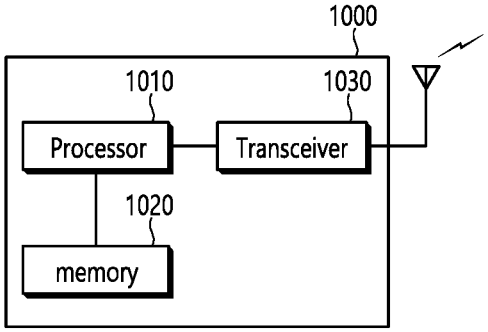
FIG. 10 shows a UE in which an embodiment of the present disclosure is implemented.

FIG. 10 shows a UE in which an embodiment of the present disclosure is implemented. The present disclosure described above at the UE side may be applied to this embodiment.

An UE 1000 includes a processor 1010, a memory 1020, and a transceiver 1030. The processor 1010 may be configured to implement the functions, processes, and/or methods described in the present disclosure. Layers of a radio interface protocol may be implemented in the processor 1010. More specifically, the processor 1010 controls the transceiver 1030 to receive a first SFI for a unpaired carrier from a network, configures a first slot in the unpaired carrier based on the first SFI, controls the transceiver 1030 to receive a second SFI for the SUL carrier from the network, and configures a second slot in the SUL carrier based on the second SFI. The first SFI and the second SFI are separate information.

The first SFI and the second SFI may be received through the same DL spectrum. The same DL spectrum may be a DL spectrum of the unpaired carrier. The DL spectrum of the unpaired carrier may be associated with the SUL carrier. The SUL carrier may use an FDD.

The memory 1020 is connected to the processor 1010 to store various information for driving the processor 1010. The transceiver 1030 is connected to the processor 1010 to transmit and/or receive radio signals.

The processor 1010 may include an application-specific integrated circuit (ASIC), another chipset, a logic circuit, and/or a data processing device. The memory 1020 may include a read-only memory (ROM), a random access memory (RAM), a flash memory, a memory card, a storage medium, and/or other storage devices. The transceiver 1030 may include a baseband circuit for processing radio frequency signals. When the embodiment is implemented in software, the above-described technique may be implemented into a module (process, function, etc.) for performing the above-described function. The module may be stored at the memory 1020 and be executed by the processor 1010. The memory 1020 may be inside or outside the processor 1010 and be connected to the processor 1010 by various well-known means.

According to an embodiment of the present disclosure described in FIG. 10, when an unpaired NR carrier and an FDD SUL carrier are associated, an SFI applied to the unpaired NR carrier and an SFI applied to the FDD SUL carrier may be separately configured. Accordingly, a slot format may be effectively configured in each carrier.

Figure 11:
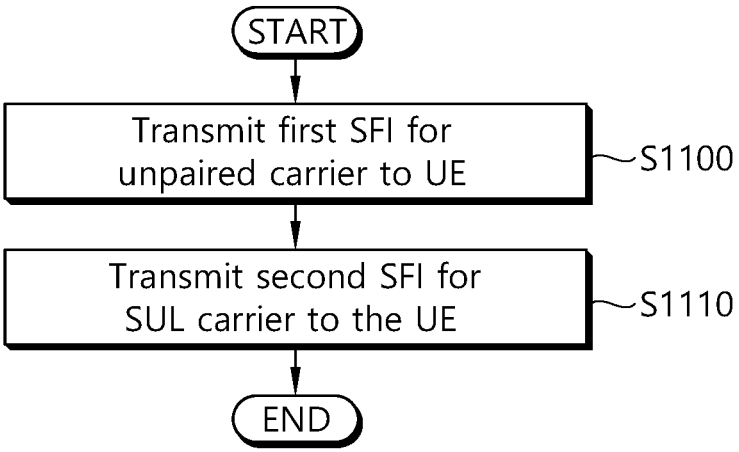
FIG. 11 shows a method in which a BS operates according to an embodiment of the present disclosure.

FIG. 11 shows a method in which a BS operates according to an embodiment of the present disclosure. The present disclosure described above at the BS side may be applied to this embodiment.

In step S1100, the BS transmits a first SFI for an unpaired carrier to the UE. In step S1110, the BS transmits a second SFI for an SUL carrier to the UE. The first SFI and the second SFI are separate information.

The first SFI and the second SFI may be received through the same DL spectrum. The same DL spectrum may be a DL spectrum of the unpaired carrier. The DL spectrum of the unpaired carrier may be associated with the SUL carrier. The SUL carrier may use an FDD.

According to an embodiment of the present disclosure described in FIG. 11, when the unpaired NR carrier and the FDD SUL carrier are associated, an SFI applied to the unpaired NR carrier and an SFI applied to the FDD SUL carrier may be separately configured.

Figure 12:
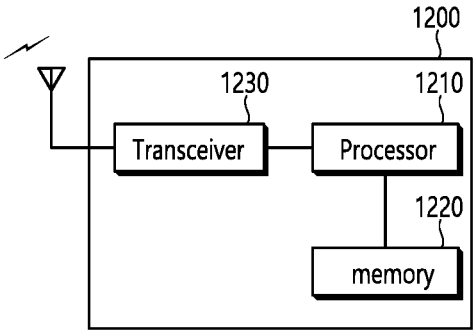
FIG. 12 shows a BS in which an embodiment of the present disclosure is implemented.

FIG. 12 shows a BS in which an embodiment of the present disclosure is implemented. The present disclosure described above at the BS side may be applied to this embodiment.

ABS 1200 includes a processor 1210, a memory 1220, and a transceiver 1230. The processor 1210 may be configured to implement functions, processes, and/or methods described in the present disclosure. Layers of a radio interface protocol may be implemented within the processor 1210. More specifically, the processor 1210 controls the transceiver 1230 to transmit a first SFI for an unpaired carrier to an UE, and controls the transceiver 1230 to transmit a second SFI for the SUL carrier to the UE. The first SFI and the second SFI are separate information.

The first SFI and the second SFI may be received through the same DL spectrum. The same DL spectrum may be a DL spectrum of the unpaired carrier. The DL spectrum of the unpaired carrier may be associated with the SUL carrier. The SUL carrier may use an FDD.

The memory 1220 is connected to the processor 1210 to store various information for driving the processor 1210. The transceiver 1230 is connected to the processor 1210 to transmit and/or receive radio signals.

The processor 1210 may include an ASIC, another chipset, a logic circuit, and/or a data processing device. The memory 1220 may include a ROM, a RAM, a flash memory, a memory card, a storage medium, and/or other storage devices. The transceiver 1230 may include a baseband circuit for processing radio frequency signals. When the embodiment is implemented in software, the above-described technique may be implemented into a module (process, function, etc.) for performing the above-described function. The module may be stored in the memory 1220 and be executed by the processor 1210. The memory 1220 may be inside or outside the processor 1210 and be connected to the processor 1210 by various well-known means.

According to an embodiment of the present disclosure described in FIG. 12, when the unpaired NR carrier and the FDD SUL carrier are associated, an SFI applied to the unpaired NR carrier and an SFI applied to the FDD SUL carrier may be separately configured.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) operating in a wireless communication system, the method comprising:

receiving, from a network, information on a first slot formation;

configuring the first slot formation based on the information on the first slot formation;

receiving, from a network, information on a second slot formation; and configuring the second slot formation based on the information on the second slot formation, wherein the information on the first slot formation and the information on the second slot formation are separate information;

wherein, for an unpaired spectrum including an unpaired carrier, and a supplemental uplink (SUL) carrier associated with the unpaired carrier, the first slot formation is for a cell on the unpaired carrier and the second slot formation is for an SUL cell on the SUL carrier; and wherein, for a paired spectrum comprising a downlink (DL) spectrum and an UL spectrum, the first slot formation is for a DL cell on the DL spectrum and the second slot formation is for a UL cell on the UL spectrum.

2. The method of claim 1, wherein the information on the first slot formation and the information on the second slot formation are received through a DL spectrum in the unpaired carrier.

3. The method of claim 1, wherein the information on the first slot formation and the information on the second slot formation are received through the DL spectrum in the paired spectrum.

4. The method of claim 1, wherein the SUL carrier uses a frequency division duplex (FDD).

5. A user equipment (UE) operating in a wireless communication system, the UE comprising:

at least one transceiver; and at least one processor; and at least one computer memory operably connectable to the at least one processor and storing instructions that, based on being executed by the at least one processor, perform operations comprising:

receiving, from a network, information on a first slot formation;

configuring the first slot formation based on the information on the first slot formation;

receiving, from a network, information on a second slot formation; and configuring the second slot formation based on the information on the second slot formation, wherein the information on the first slot formation and the information on the second slot formation are separate information;

wherein, for an unpaired spectrum including an unpaired carrier, and a supplemental uplink (SUL) carrier associated with the unpaired carrier, the first slot formation is for a cell on the unpaired carrier and the second slot formation is for an SUL cell on the SUL carrier, and wherein, for a paired spectrum comprising a downlink (DL) spectrum and an UL spectrum, the first slot formation is for a DL cell on the DL spectrum and the second slot formation is for a UL cell on the UL spectrum.

6. The UE of claim 5, wherein the information on the first slot formation and the information on the second slot formation are received through a DL spectrum in the unpaired carrier.

7. The UE of claim 5, wherein the information on the first slot formation and the information on the second slot formation are received through the DL spectrum in the paired spectrum.

8. The UE of claim 5, wherein the SUL carrier uses a frequency division duplex (FDD).

9. The method of claim 1, wherein the UE is in communication with at least one of a mobile device, a network, and/or autonomous vehicles other than the UE.

10. A user equipment (UE) operating in a wireless communication system, the UE comprising:

at least one processor; and at least one memory operably connectable to the at least one processor, wherein the at least one processor is configured to:

obtain information on a first slot formation;

configure the first slot formation based on the information on the first slot formation;

obtain information on a second slot formation; and configure the second slot formation based on the information on the second slot formation, wherein the information on the first slot formation and the information on the second slot formation are separate information;

wherein, for an unpaired spectrum including an unpaired carrier, and a supplemental uplink (SUL) carrier associated with the unpaired carrier, the first slot formation is for a cell on the unpaired carrier and the second slot formation is for an SUL cell on the SUL carrier, and wherein, for a paired spectrum comprising a downlink (DL) spectrum and an UL spectrum, the first slot formation is for a DL cell on the DL spectrum and the second slot formation is for a UL cell on the UL spectrum.

*11. A method performed by a user equipment (UE) adapted to operate in a wireless communication system, the method comprising:*

*receiving from a network information on a first slot formation;*

*configuring the first slot formation based on the information on the first slot formation;*

*receiving, from a network information on a second slot formation; and*

*configuring the second slot formation based on the information on the second slot formation,*

*wherein the information on the first slot formation and the information on the second slot formation are separate information,*

*wherein, for an unpaired spectrum operation, the information on the first slot formation is for a non-supplementary uplink (non-SUL) carrier and the information on the second slot formation is for a SUL carrier, and*

*wherein, for a paired spectrum operation, the information on the first slot formation is for a downlink (DL) and the information on the second slot formation is for an uplink (UL).*

*12. A user equipment (UE) adapted to operate in a wireless communication system, the UE comprising:*

*at least one transceiver;*

*at least one processor; and*

*at least one computer memory operably connectable to the at least one processor and storing instructions that, based on being executed by the at least one processor, perform operations comprising:*

*receiving, from a network, information on a first slot formation;*

*configuring the first slot formation based on the information on the first slot formation;*

*receiving, from a network, information on a second slot formation; and*

*configuring the second slot formation based on the information on the second slot formation,*

*wherein the information on the first slot formation and the information on the second slot formation are separate information,*

*wherein, for an unpaired spectrum operation, the information on the first slot formation is for a non-supplementary uplink (non-SUL) carrier and the information on the second slot formation is for a SUL carrier, and*

*wherein, for a paired spectrum operation, the information on the first slot formation is for a downlink (DL) and the information on the second slot formation is for an uplink (UL).*

* * * * *